(12) United States Patent
Boegelund et al.

(10) Patent No.: US 8,683,313 B2
(45) Date of Patent: *Mar. 25, 2014

(54) SYSTEM FOR PROCESSING MIXED-FORMAT FILES

(71) Applicant: International Business Machines Corporation, Armonk, NY (US)

(72) Inventors: Flemming Boegelund, Frederikssund (DK); Steven Earl Hicks, Coppell, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/680,031

(22) Filed: Nov. 17, 2012

(65) Prior Publication Data

US 2013/0080878 A1 Mar. 28, 2013

Related U.S. Application Data

(63) Continuation of application No. 11/924,684, filed on Oct. 26, 2007, now Pat. No. 8,381,089.

(51) Int. Cl.
*G06F 17/00* (2006.01)

(52) U.S. Cl.
USPC .......... 715/209; 715/221; 715/224; 715/255; 715/256

(58) Field of Classification Search
USPC .............. 715/221, 234, 255, 256, 209, 224
See application file for complete search history.

(56) References Cited

U.S. PATENT DOCUMENTS

| | | | |
|---|---|---|---|
| 6,224,048 B1 * | 5/2001 | Motamed | 270/52.02 |
| 6,535,912 B1 * | 3/2003 | Anupam et al. | 715/206 |
| 6,931,603 B2 * | 8/2005 | Boegelund | 715/846 |
| 7,162,691 B1 * | 1/2007 | Chatterjee et al. | 715/205 |
| 7,328,456 B1 * | 2/2008 | Szor et al. | 726/26 |
| 7,392,522 B2 * | 6/2008 | Murray et al. | 717/174 |
| 7,975,214 B2 * | 7/2011 | Boegelund et al. | 715/224 |
| 8,023,055 B2 * | 9/2011 | Nakajima et al. | 349/43 |
| 2004/0054670 A1 * | 3/2004 | Noff et al. | 707/3 |

OTHER PUBLICATIONS

U.S. Appl. No. 11/924,684; SB08 Oct. 26, 2007.
U.S. Appl. No. 11/924,684; 1449 Oct. 7, 2010.
U.S. Appl. No. 11/924,684; PTO-892 Oct. 7, 2010.
U.S. Appl. No. 11/924,684; Non-Final Office Action Oct. 7, 2010.
U.S. Appl. No. 11/924,684; Amendment Jan. 3, 2011.

(Continued)

*Primary Examiner* — Chau Nguyen
(74) *Attorney, Agent, or Firm* — David A. Mims, Jr.; Arthur Samodovitz; Robert V. Wilder

(57) ABSTRACT

A method, medium and implementing processing system are provided for book marking a combination of frame URLs within a frameset and allowing the sharing on multiple PCs the saved form data that may have been filled in. The system uses an image as a hotspot, containing a complex target destination in the form of an XML structure with multiple URLs for multiple frames as well as captured form data. This system combines file types such as XML and JPG, e.g. as in sample file name 'MyCapturedFramesAndFormData.XML.JPG' or 'MyCapturedFramesAndFormData.XML.GIF'. This combination provides a surprising effect compared to the prior systems, namely, launching the image in an enhanced web browser or in a web browser containing a new plug-in, displays the frame just as it was when saved, including frame set and data input to displayed forms.

20 Claims, 4 Drawing Sheets

(56) References Cited

OTHER PUBLICATIONS

U.S. Appl. No. 11/924,684; PTO-892 Mar. 17, 2011.
U.S. Appl. No. 11/924,684; Final Office Action Mar. 17, 2011.
U.S. Appl. No. 11/924,684; Request for CPA Jun. 13, 2011.
U.S. Appl. No. 11/924,684; Non-Patent Literature Jun. 16, 2011.
U.S. Appl. No. 11/924,684; SB08 Jun. 16, 2011.
U.S. Appl. No. 11/924,684; 1449 Oct. 9, 2012.
U.S. Appl. No. 11/924,684; PTO-892 Oct. 9, 2012.
U.S. Appl. No. 11/924,684; Notice of Allowance Oct. 9, 2012.

* cited by examiner

SYSTEM FOR PROCESSING MIXED-FORMAT FILES

RELATED APPLICATIONS

This is a Continuation of, and claims priority from, application Ser. No. 11/924,684 which was filed on Oct. 26, 2007, now U.S. Pat. No. 8,381,089 issued on Feb. 19, 2013. This application is also related to application Ser. No. 09/998,045 filed on Nov. 29, 2001, now U.S. Pat. No. 6,931,603 which issued on Aug. 16, 2005, and application Ser. No. 11/924,667 filed on Oct. 26, 2007, now U.S. Pat. No. 7,975,214 issued on Jul. 5, 2011.

FIELD OF THE INVENTION

The present invention relates generally to information processing systems and more particularly to a methodology and implementation for retrieving and processing mixed-format files.

BACKGROUND OF THE INVENTION

Currently, when a user browses the Internet and wants to bookmark a website using 'frames', it is not possible to bookmark the combination of frame URLs within the frameset as presented on the user's display. With known bookmarking technology the user can only bookmark individual URLs, either for a frame or for the entire frameset.

Further, when a user browses the Internet and wants to 'bookmark', or, in other words, 'save' form data that may have been filled into the displayed form, the data cannot be shared among multiple users on multiple PCs. Using existing form data technology, the user can only re-use form data on the same PC where it was first captured. Current systems relate simple universal resource locators (URLs) with a specific image file. The URL and the image are stored separately on a user's personal computer (PC) system and the system does not allow the capture or re-creation and processing of specific frames or form data.

Thus, there is a need for an improved processing system which enables a user to selectively retrieve both frame information as well as data which are input to forms presented on a user display device.

SUMMARY OF THE INVENTION

A method, medium and implementing processing system are provided for accessing and processing mixed-format files in order to re-create frame, form and data information which is all stored in a single file. The system determines when an accessed file is in a mixed-format, e.g. when the file name includes file designators indicative of more than one file-type. The system then separates the single file content into separate files of different formats, e.g. graphics and text formats, and uses the information contained in one of the formats to re-create and display form information from a website including data previously input to the form by a user.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

The various methods discussed herein may be implemented within a computer or other communication system which includes processing means, memory, updateable storage, input means and display means. Since the individual components of a system which may be used to implement the functions used in practicing the present system are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a personal computer system, it is understood that wireless cellular or other wireless systems may also be implemented to achieve the beneficial functional features described. Further, it is understood that the principles of the invention may be implemented in any of many available and future computer and communication devices and systems.

In the disclosed system, which may be in the form of a web browser plug-in, an XML structure is used to store multiple URLs for framesets as well as data entered into any number of forms in any number of frames. The XML structure is stored inside an image representing the website. XML is appended to the JPG or other graphics file as is hereinafter set forth in detail.

When loading an image representing the website, for example, the web browser plug-in extracts the XML from the image and uses the XML to restore the original website, with the captured individual frames as well as captured form data. Each frame has been automatically preset and form data has been pre-filled. The captured amount of scrolling has also been automatically restored.

The file type for the graphical image in the example contains the string ".XML" as well as the normal file type for the image itself, e.g. ".JPG". This allows the browser plug-in code to discover the imbedded XML when the graphical image is selected and/or loaded into the browser application.

For example the entire file name for the graphical image may be "MyCapturedFramesAndFormData.XML.JPG". This single mixed-format file can be shared amongst multiple users. For instance user A might fill in all the required fields for booking an airline flight and save the image. The saved file could be sent to user B (for example as an email attachment). User B then has the option of making changes, or submitting the booking as is, including the form data that had been filled-in by user A.

Figure 1:
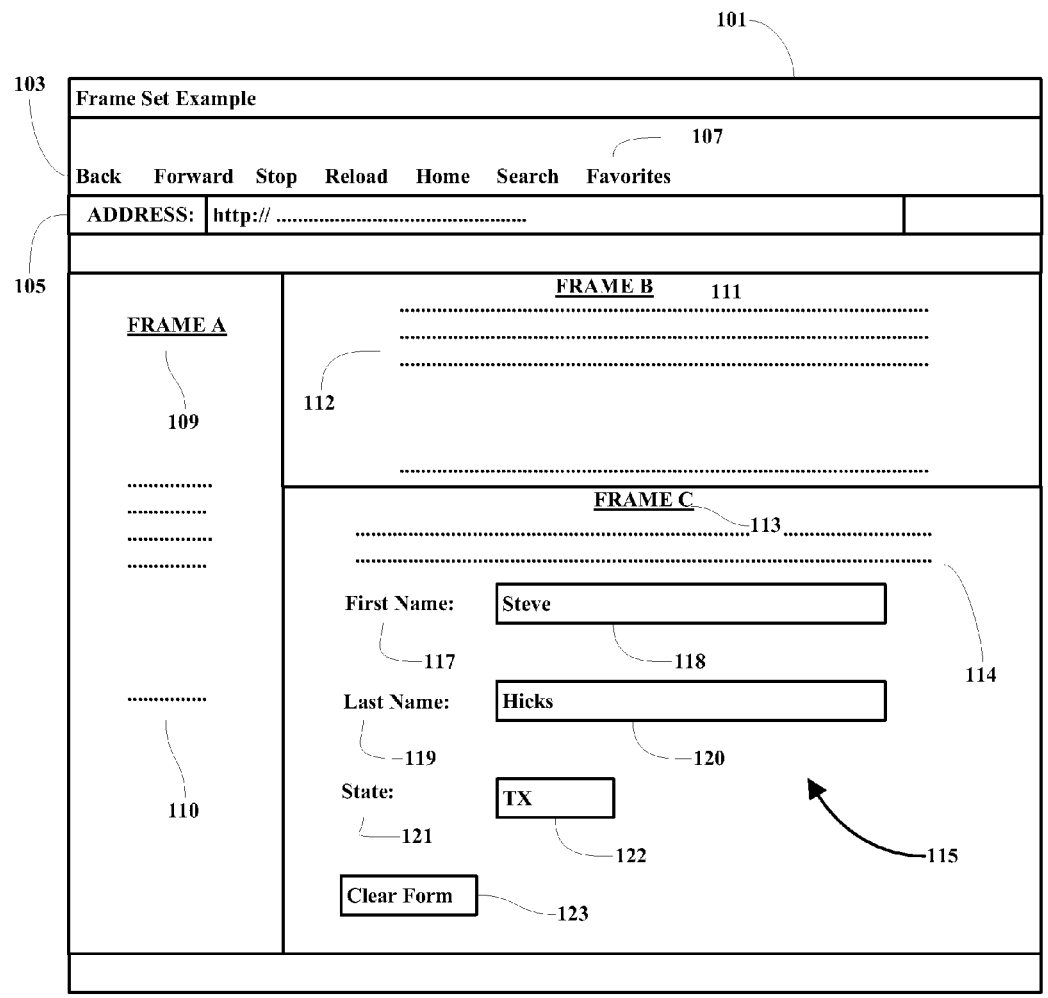
FIG. 1 is an illustration of an exemplary browser screen showing several exemplary frames and data input to one of the frames.

With specific reference to the illustrations presented in the drawings, FIG. 1 shows an exemplary browser screen having several exemplary frames and data input to one of the frames. In the example, a browser display screen 101 includes a browser menu bar 103 which further includes various user selectable browser functions including a "Favorites" function 107. Also shown is an "ADDRESS" field 105 where a user may enter a selected URL address of a particular website which the user wishes to access through an interconnection network such as the Internet.

The FIG. 1 example also shows three frames 109, 111 and 113 being displayed on the user's display screen 101. Frames A 109 and B 111 may include information 110 and 112, respectively, of interest to the user, while Frame C 113, in the example, includes a fill-in form 115 to which the user may input particular data called for by the form. In the example, in addition to other information 114, Frame C 113 includes input field designators 117, 119 and 121 which call for the input of a first name in block 118, a last name in block 120 and a State in block 122. Frame C 113 also includes a "Clear Form" selection 123 by which the user is enabled to clear all information from the form displayed in Frame C 113.

Figure 2:
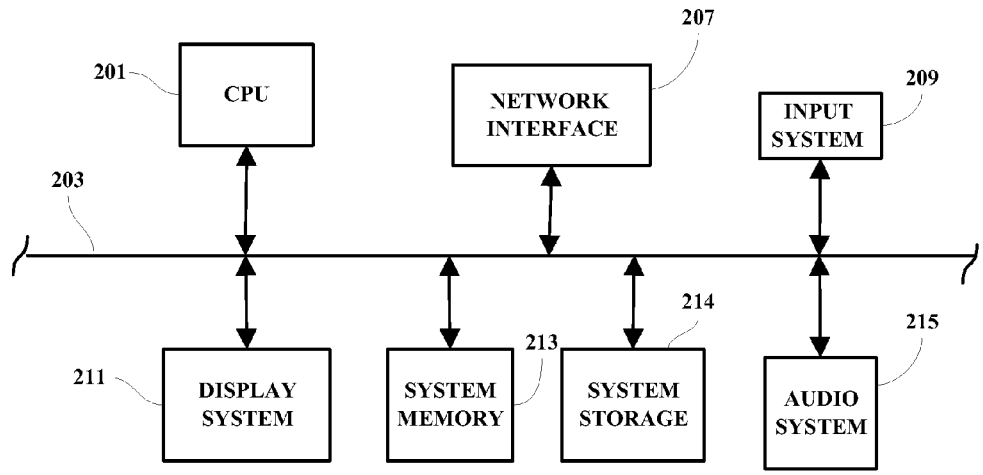
FIG. 2 is a block diagram showing several of the major components of a user computer system which may be used in conjunction with the present invention.

FIG. 2 illustrates a block diagram showing several of the major components of a user computer system which may be used in conjunction with the present invention. As shown, a user computer or other communication device usable for accessing the Internet for example, includes at least one central processor unit or CPU 201 which is connected to a main bus 203. Also connected to the main bus 203 is a network interface 207 for connecting through the Internet to selected URLs, and an input system 209. The input system includes a keyboard or keypad (as on a wireless implementation) as well as a mouse (as on a personal computer implementation). A display system 211, system memory 213, system storage 214 and an optional audio system 215 which may also be included and connected to the main bus 203. Other devices and systems may be included and connected to the main bus 203 depending upon the particular application. As illustrated, the system shown in FIG. 2 is operable to run an Internet browser program to access selected websites by connecting to selected URLs through an Internet connection.

Figure 3:
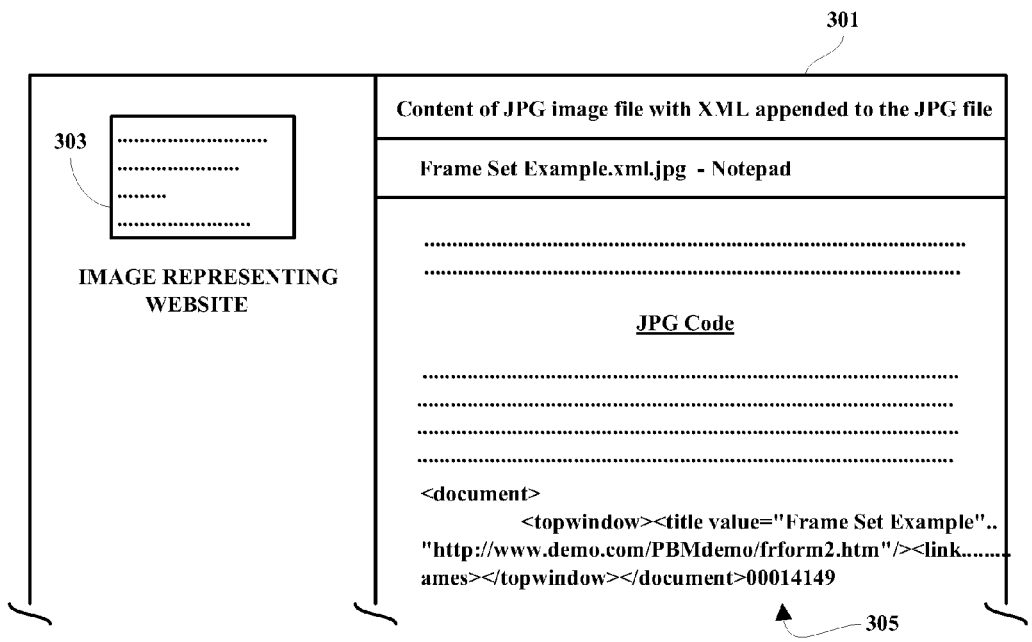
FIG. 3 is an illustration showing an XML reference appended to a JPG file in accordance with the present system.

FIG. 3 shows the content of a JPG image file 301 with an image 303 representing the website and XML 305 appended to the JPG file. The XML structure is stored inside the image 303 representing the website. When loading the image 303 representing the website for example, the web browser which is enhanced with an implementation of the present invention, extracts the XML from the image and uses the XML to restore the original website, with the captured individual frames as well as captured form data to provide the display as illustrated in FIG. 1.

Figure 4:
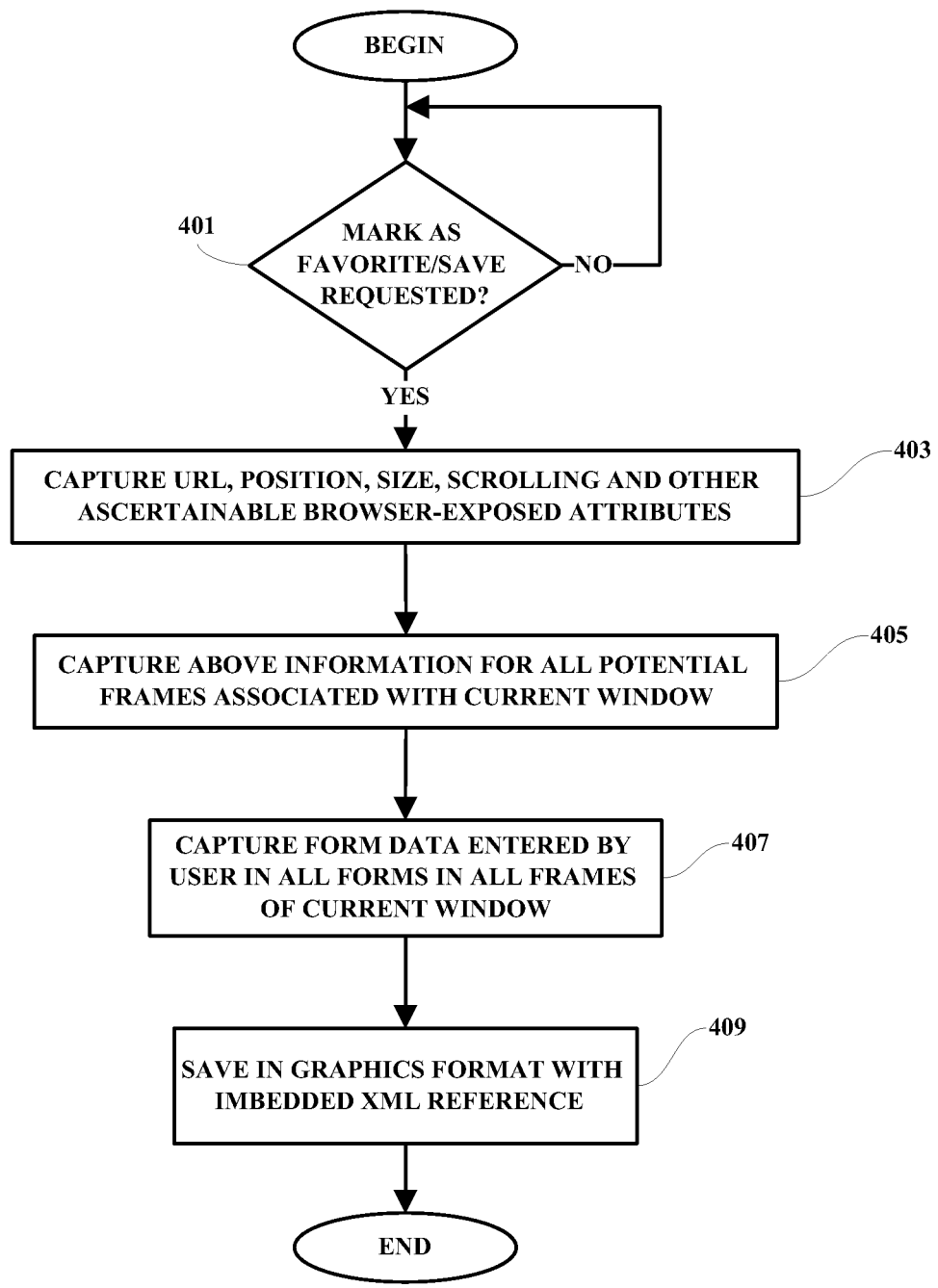
FIG. 4 is a flow chart illustrating an exemplary operation of one processing function implemented in accordance with the present system.

FIG. 4 illustrates a flow chart for an exemplary operation of one processing function implemented in accordance with the present invention. More specifically, when a user, for example, has displayed a browser screen such as shown in FIG. 1, the user is enabled to select 401 a "Save" or "Favorites" function, and the URL, position and size information and other ascertainable browser-exposed attributes of the displayed screen are captured 403 for all potential frames 405 displayed in the current window. Also, the form data which had been entered by the user are also captured 407 for all frames of the current window. Next, all of the above captured information is saved in graphics format 409 with an embedded XML reference at the end of the graphics file.

Figure 5:
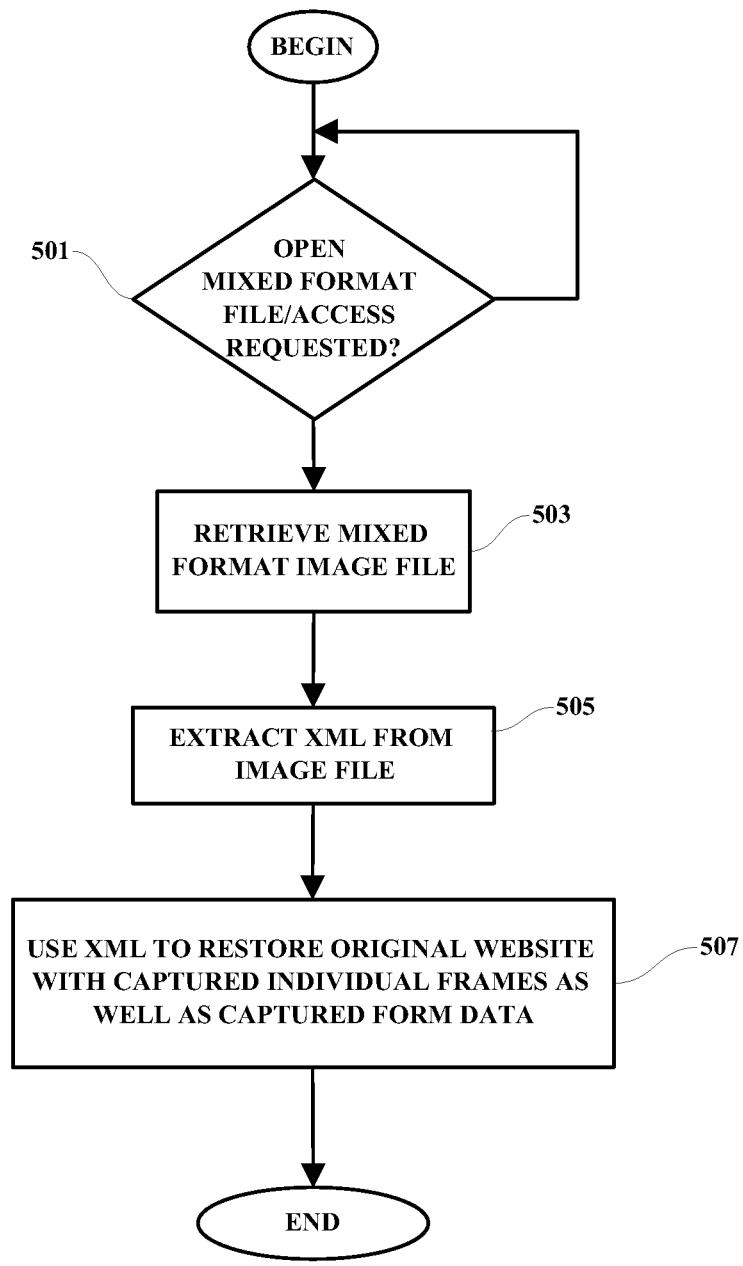
FIG. 5 is a flow chart illustrating an exemplary operation of a second processing function implemented in accordance with the present system.

FIG. 5 illustrates a flow chart for an exemplary operation of a second processing function implemented in accordance with the present invention. More specifically, when a user requests to open a file 501 which may be a file previously created by the user or which may have been received from another user as an attachment to an email for example, the mixed format (XML/Graphics) image file is retrieved 503 and the appended XML is extracted 505 and used to restore the original website 507 with captured individual frames as well as captured input form data. The graphics code may be any of many available including but not limited to JPG or GIF. An exemplary listing of the XML code for the example shown in FIG. 1, is as follows:

```
<?xml version="1.0" encoding="utf-8" ?>
<document>
    <topwindow>
        <title value="Frame Set Example" />
        <url value="http://www.demo.com/PBMdemo/frameset.htm" />
        <scrollTop value="0" />
        <scrollLeft value="0" />
        <frames>
            <count value="3" />
            <frame name="noname">
                <url
                    value="http://www.demo.com/PBMdemo/frametoc.htm
                    " />
                <scrollTop value="0" />
                <scrollLeft value="0" />
            </frame>
            <frame name="toptoc">
                <url
                    value="http://www.demo.com/PBMdemo/formtoc.htm"
                    />
                <scrollTop value="30" />
                <scrollLeft value="0" />
            </frame>
            <frame name="outer">
                <url
                    value="http://www.demo.com/PBMdemo/frform4.htm"
                    />
                <scrollTop value="95" />
                <scrollLeft value="0" />
                <form id="">
                    <field name="first_name">
                        <nodename value="INPUT" />
```

```
                <field value="Steve" />
            </field>
            <field name="last_name">
                <nodename value="INPUT" />
                <field value="Hicks" />
            </field>
            <field name="state">
                <nodename value="INPUT" />
                <field value="TX" />
            </field>
            <field name="">
                <nodename value="INPUT" />
                <field value="Clear Form" />
            </field>
        </form>
      </frame>
    </frames>
  </topwindow>
</document>
```

It is understood that the above code listing is only one example of an implementation of the present invention and that there are many code and other implementations which may be constructed in order to accomplish the desirable results attainable through the use of the present invention.

In the example, the file type for the graphical image (see FIG. 3) contains the string "XML" as well as the normal file type for the image itself, e.g. "JPG". This allows the browser plug-in of the present invention to discover the embedded XML when the graphical image is selected and/or loaded into the browser. For example, the entire file name for the graphical image could be "MyCapturedFramesAndFormData.XML.JPG". This single mixed-format file can be shared amongst multiple users. For instance, user A might fill in all the required fields for booking an airline flight and then save the image. User A could then send or transmit the image or single mixed-format file to user B, for example, as an email attachment, and user B will then have the option of making changes or submitting the booking as is.

The method, system and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in any memory device, including portable or fixed, volatile or non-volatile memory device, including CDs, RAM and "Flash" memory, or other semiconductor, optical, magnetic or other memory storage devices from which it may be loaded and/or transmitted into other media storage devices and executed to achieve the beneficial results as described herein. It is noted that as used herein the term computer readable storage device(s) does not encompass a propagation media. The present invention is, however, not intended to be limited to the specific form set forth herein, but on the contrary, it is intended to cover such alternatives, modifications, and equivalents, as can be reasonably included within the spirit and scope of the invention.

What is claimed is:

1. A method for processing a single mixed-format file in a computer system, the method comprising:
   the computer system determining that the single mixed-format file contains content information in a graphics file format and another file format, said another file format being different from said graphics file format;
   the computer system using the content information in the graphics file format to restore an original displayed presentation including a re-creation of a form in the graphics file format together with a re-creation of text data content in said another file format, the text data content having been previously input to the form by a user;
   the computer system receiving user-input changes to the recreation of the text data content in the restored original displayed presentation and generating in the single mixed-format file the form with the user-input changes to the text data content.

2. The method as set forth in claim 1 and further including before the computer system using the content information in the graphics file format to restore the original displayed presentation, the computer system extracting the content information in the graphics file format from the single mixed-format file, and using the extracted content information to restore a display of an original presentation on a display device, the original displayed presentation including the content information in both the graphics file format and said another file format.

3. The method as set forth in claim 1 wherein said another file format is a text processing file format.

4. The method as set forth in claim 1 wherein the graphics file format is a "JPG" file format.

5. The method as set forth in claim 1 wherein the graphics file format is a "GIF" file format.

6. The method as set forth in claim 3 wherein said another file format is an "XML" file format.

7. The method as set forth in claim 1 wherein before the computer system accessing the single mixed-format file, the computer system receiving the single mixed-format file from a remote computer system.

8. A computer program product for implementing a method for processing a single mixed-format file, the computer program product comprising:

one or more computer-readable storage devices and program instructions stored on at least one of the one or more storage devices, the program instructions comprising:

program instructions to access the single mixed-format file;

program instructions to determine that the first single mixed-format file contains content information in a graphics file format and another file format, said another file format being different from said graphics file format;

program instructions to use the content information in the graphics file format to restore an original displayed presentation including a re-creation of a form in the graphics file format together with a re-creation of text data content in said another file format, the text data content having been previously input to the form by a user;

program instructions to enable user-input changes to the text data content in the restored original displayed presentation; and program instructions for receiving said user-input changes to the recreation of the text data content in the restored original displayed presentation and generating in the single mixed-format file, the form with the user-input changes to the text data content.

9. The computer program product as set forth in claim 8 and further including program instructions wherein before using the content information in the graphics file format to restore the original displayed presentation, the program instructions are implemented to extract the content information in the graphics file format from the single mixed-format file, and use the extracted content information to restore a display of an original presentation on a display device, the original displayed presentation including the content information in both the graphics file format and said another file format.

10. The computer program product as set forth in claim 8 wherein said another file format is a text processing file format.

11. The computer program product as set forth in claim 8 wherein the graphics file format is a "JPG" file format.

12. The computer program product as set forth in claim 8 wherein the graphics file format is a "GIF" file format.

13. The computer program product as set forth in claim 8 wherein said another file format is an "XML" file format.

14. The computer program product as set forth in claim 8 wherein the program instructions before the accessing the single mixed-format file, are implemented to enable receipt of the single mixed-format file from a remote computer system.

15. A computer system for processing a single mixed-format file, the system comprising:

one or more processors, one or more computer-readable memories, one or more computer-readable storage devices, and program instructions stored on at least one of the one or more storage devices for execution by at least one of the one or more processors via at least one of the one or more memories, the program instructions comprising:

program instructions to access a single mixed-format file;

program instructions to determine that the single mixed-format file contains content information in a graphics file format and another file format, said another file format being different from said graphics file format;

program instructions to use the content information in the graphics file format to restore an original displayed presentation including a re-creation of a form in the graphics file format together with a re-creation of text data content in said another file format, the text data content having been previously input to the form by a user;

program instructions to enable user-input changes to the text data content in the restored original displayed presentation; and program instructions for receiving said user-input changes to the recreation of the text data content in the restored original displayed presentation and generating in the single mixed-format file, the form with the user-input changes to the text data content.

16. The computer system as set forth in claim 15 and further including program instructions to extract the content information in the graphics file format from the single mixed-format file, and to use the extracted content information to restore a display of an original presentation on a display device, the original displayed presentation including the content information in both the graphics file format and said another file format.

17. The computer system as set forth in claim 15 wherein said another file format is a text processing file format.

18. The computer system as set forth in claim 15 wherein the graphics file format is a "JPG" file format.

19. The computer system as set forth in claim 15 wherein the graphics file format is a "GIF" file format.

20. The computer system as set forth in claim 15 wherein said another file format is an "XML" file format.

* * * * *